United States Patent

Weber et al.

[11] 3,891,861
[45] June 24, 1975

[54] DEVICE FOR MONITORING THE TEMPERATURE OF ROTATING MACHINE PARTS

[75] Inventors: Karl-Heinz Weber, Witten-Heven; Anton Dinkelbach, Gelsenkirchen, both of Germany

[73] Assignee: Gebr. Eickhoff, Maschinenfabrik und Eisengiesseri m.b.H., Bochum, Germany

[22] Filed: Jan. 23, 1974

[21] Appl. No.: 435,878

[30] Foreign Application Priority Data
Feb. 3, 1973  Germany............................ 2305388

[52] U.S. Cl. ............ 307/117; 307/106; 73/362 CP; 219/495
[51] Int. Cl. ........................................ H01h 36/00
[58] Field of Search ................ 307/116, 117, 106; 219/495; 317/133, 133.5; 335/146, 208; 318/471, 473, 653; 310/4, 113, 114, 168, 169; 336/110; 200/61.46, 61.39; 340/258 C, 269, 231, 228 F; 73/351, 362 CP

[56] References Cited
UNITED STATES PATENTS

| | | | |
|---|---|---|---|
| 2,963,691 | 12/1960 | Yerger............................ | 340/269 X |
| 3,132,337 | 5/1964 | Martin........................... | 310/170 X |
| 3,738,175 | 6/1973 | Linsig............................ | 73/362 CP |

*Primary Examiner*—Robert K. Schaffer
*Assistant Examiner*—M. Ginsburg
*Attorney, Agent, or Firm*—Brown, Murray, Flick & Peckham

[57] ABSTRACT

Non-contact temperature monitoring of a rotating machine element such as a brake drum by an apparatus including a ferromagnetic insert in the rotating machine element and shielded therefrom by non-magnetic, heat conductive material. An inductive pulse transmitter is arranged to form an air gap with the rotary moving insert. The transmitter delivers an electrical pulse in response to each passage of the insert during rotation thereof. The pulses are amplified and shaped before passing into an integrating circuit wherein the pulses form the control signal connected to a relay for interrupting a power supply to a drive for the rotating machine element when the temperature thereof exceeds Curie Point of the ferromagnetic material. When the Curie Point is exceeded, the insert becomes paramagnetic and fails to produce pulses and disrupts the control signal for the relay.

6 Claims, 7 Drawing Figures

PATENTED JUN 24 1975  3,891,861

DEVICE FOR MONITORING THE TEMPERATURE OF ROTATING MACHINE PARTS

BACKGROUND OF THE INVENTION

This invention relates to an apparatus for the non-contact monitoring of the temperature of rotating machine parts. The invention is particularly useful for monitoring the temperature of brake drums and the like.

It is a usual practice to employ safety mechanisms or devices in conjunction with rotating machine parts, especially heavy-duty brake drums which are intensely heated during service. The safety mechanisms are tied-in with the control for the drive of the rotating machine part to stop the drive when an excessive temperature is encountered. The safety devices include a safety fuse of low fusing metal and a radially movable bolt or pin. When the safety fuse melts, the bolt or pin is displaced in an outward direction. This movement of the pin occurs in response to the centrifugal force imposed on it or due to the pressure of a spring. When the pin is displaced outwardly, a switch placed in its rotary path, is actuated which, in turn, disconnects the drive from electrical transmission lines.

The present level of technology in this field further includes incorporating thermal contacts into the shoe elements of disc brakes. The thermal contacts emit pulses when a permissible brake shoe temperature is exceeded. The pulses cause the drive in the mechanical system to be switched OFF. Thus, when the drive is connected in a mechanical system that includes a belt-type conveyor, the conveyor is stopped when the temperature of the brake lining exceeds the predetermined permissible temperature. However, as the brake lining on the brake shoes wears out so do the thermal contacts embedded within them and they must, therefore, be replaced along with the brake lining.

SUMMARY OF THE INVENTION

It is an object of the present invention to provide an apparatus for monitoring the temperature of a rotatable element during rotation thereof without contact therewith.

It is a further object of the present invention to provide an apparatus for monitoring the temperature of a rotatable element during its rotation and without contact therewith which apparatus is useful in a continuing manner to monitor the temperature notwithstanding temperature excursions exceeding a predetermined level at which temperature level the apparatus signals to cease rotation of the rotating element.

In accordance with the present invention, there is provided an apparatus for monitoring the temperature of a rotatable element during rotation without contact therewith, the apparatus comprising a ferromagnetic insert carried by the rotatable element for rotary movement therewith, an inductive pulse transmitter forming an air gap with the ferromagnetic insert for producing an electrical pulse in response to the passing movement of the insert relative to the transmitter, means for shaping and amplifying successive pulses produced by the transmitter, means receiving the shaped and amplified pulses for producing a control signal and, means responsive to the control signal for controlling rotation of the rotatable element.

The goal of the present invention of providing a non-contact temperature monitoring device is achieved by embedding into a rotatable element which is to undergo temperature monitoring, an insert of ferromagnetic material at a generally exposed rotating surface. At the immediate vicinity of the insert and forming an air gap therewith or within the path of rotation of the machine element there is provided an inductive pulse transmitter. This transmitter is connected to an output relay by way of an amplifier and pulse-shaping circuit as well as an integrating circuit including resistance and capacitance members. The ferromagnetic material of the insert changes the magnetic flow within the pulse transmitter during each passing movement, thus creating in a periodic manner successive electrical pulses with the cycles of rotation. These pulses after passing through an amplifier and pulse shaper, pass through an integrating circuit. The output of the integrating circuit is manifest as a continuous signal for control of a relay. Temperature fluctuations of the machine element being monitored, affects the ferromagnetic material making up the insert. The magnetic flow through the insert diminishes very suddenly when its temperature increases to a level above the Curie Point. When the Curie Point of the ferromagnetic material is exceeded, it behaves in a paramagnetic manner, that is, like a normal dielectric. This causes a failure to produce electrical pulses and therefore the cessation of the continuous control signal, indicating an excessive temperature, that in turn deenergizes the relay to switch OFF the drive for the machine part that is being monitored.

In accordance with a further characteristic of the present invention when monitoring the temperature of a machine element made up of magnetic material, then the insert of ferromagnetic material is shielded from the machine part to be monitored by non-magnetic, heat conductive material. Such shielding is provided by attaching a ring of non-magnetic heat conductive material coaxially with the machine element to be monitored for rotation therewith and then using the ring as a carrier for the insert.

It is a further aspect of the present invention to embed a ferromagnetic insert within a larger insert of non-magnetic heat conductive material so that both inserts are carried at the peripheral area of the machine element to undergo monitoring of its temperature. When this arrangement of parts is provided, the magnetic flow is interrupted twice during each rotation of the machine element as the ferromagnetic insert passes the inductive pulse transmitter. Thus, two pulses occur during each rotation of the machine element and both such pulses are used to produce the control signal for the relay. In this aspect of the present invention, when the temperature of the embedded ferromagnetic insert is elevated to a point exceeding its Curie temperature level, then a single electrical pulse is produced during each rotation which is detected to indicate an excessive temperature excursion.

In order to switch OFF the power supply for the drive of the machine part being monitored, the present invention provides for the detection of the single pulse occuring each rotation instead of the usual two pulses by connecting at the output of the pulse-shaping and amplifying circuit to a timing circuit, such as a monostable multivibrator. The pulses are conducted through the timing circuit to a bistable trigger circuit such as a flip-flop which is, in turn, connected at its output to the integrating signal. So long as the amplifier and pulse-shaping circuits deliver double pulses during each revolution of the machine element, the trigger circuit delivers an output signal in response to the double pulses. This output signal is then delivered to the integrating circuit to produce a continuous control signal. The continuous control signal retains the relay in a position in which the drive for the machine part being monitored is connected to the electrical circuit. If excessive temperatures occur, i.e., exceeding the Curie temperature point, then only one electrical pulse is produced during each revolution of the insert and the two-condition trigger circuit is no longer triggered, thus not producing an output signal. The relay is therefor deenergized which disconnects the drive for the machine part from the electrical circuit.

These features and advantages of the present invention as well as others will be more apparent when the following description is read in light of the accompanying drawings, in which.

Figure 1:
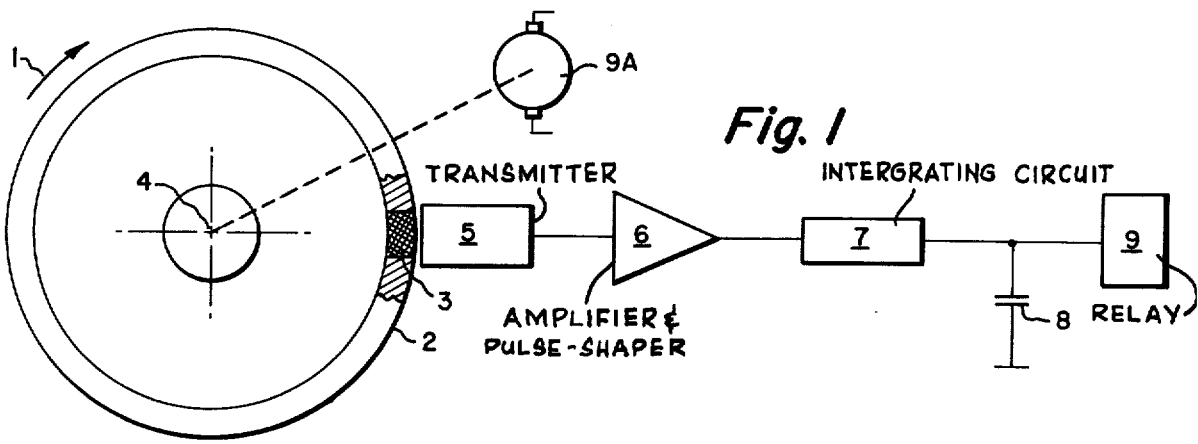
FIG. 1 is a schematic illustration including electrical circuitry according to one form of apparatus for monitoring the temperature of a rotatable machine element.

In FIG. 1, there is illustrated a rotating element 2 of a machine such as, for example, a brake drum which rotates in the direction of arrow 1. In FIG. 1, it will be assumed that the rotating element 2 is constructed from non-magnetic material. An insert 3 of ferromagnetic material is located at the outer periphery of the rotating element for rotation therewith about an axis 4. An inductive pulse transmitter 5 is supported in a stationary manner to form an air gap with the rotating machine element 2 and the ferromagnetic insert 3. During each revolution of the machine element 3, the insert passes in close proximity to the inductive pulse transmitter whereby the ferromagnetic material of the insert changes the magnetic flow in the transmitter. Thus, the output signal from the transmitter is a form of a pulse occuring during each revolution of the machine element as the insert passes the transmitter. The pulses from the transmitter 5 are received by an amplifier and pulse-shaper circuit 6 where each of the successive pulses are intensified and shaped into a rectangular pulse form. The pulse signal output from the pulse-shaper and amplifier 6 is fed to an integrating circuit including a resistor 7 and capacitor 8. This integrating circuit changes the rectangular form of the pulses into what is an essentially continuous control signal for maintaining a relay 9 in an ON switched position so as to deliver power to, for example, a motor 9A that is mechanically coupled to the machine element.

Any temperature changes that occur in the machine element 2 affect the ferromagnetic insert 3 whereby it attains essentially the same temperature as the machine element. When the temperature of these parts exceeds the Curie Point then in this event, there is a failure to produce a continuous control signal to the relay 9 and thus it becomes deenergized which, in turn, disconnects the power supply from the motor 9A. Those skilled in the art will readily understand that other forms of drive mechanism may be provided other than the motor 9A which has been illustrated only for the purpose of this description.

Figure 2:
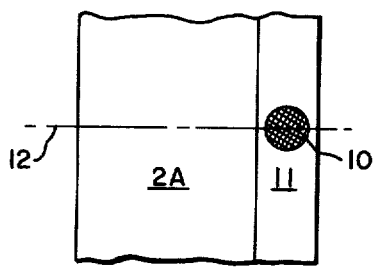
FIG. 2 is a partial view of a machine element with a modified arrangement of part for providing an insert for temperature monitoring according to the features of the present invention.

FIG. 2 illustrates an arrangement of parts according to the present invention wherein a ferromagnetic insert 10 is to be carried by a machine element 2A consisting of magnetic materials such as steel. In FIG. 2, the machine part 2A has attached to it a ring 11 made from non-magnetic material and serves to support the ferromagnetic insert 10 while shielding it from the steel material of the machine element 2A. The ring 11 is attached to the face of the machine element 2A for rotation therewith about an axis of rotation 12. Thus, the ring 11 shields the insert 10 so that the insert can produce the impulses needed for monitoring the temperature of the machine element using the circuitry and in the manner described in conjunction with FIG. 1.

Figure 3:
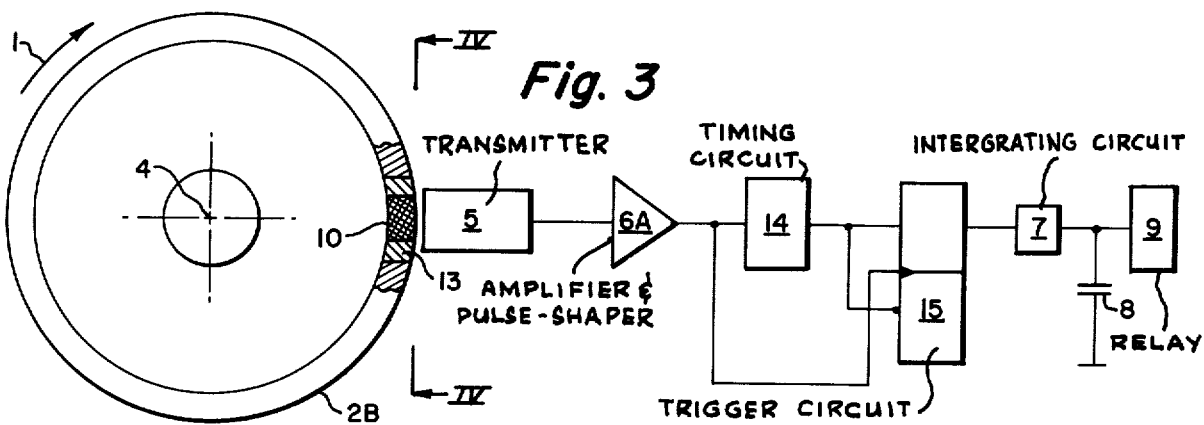
FIG. 3 is a view similar to FIG. 1 but illustrating a modified arrangement of part to provide a ferromagnetic insert and modified circuitry for the pulses produced thereby.
Figure 4:
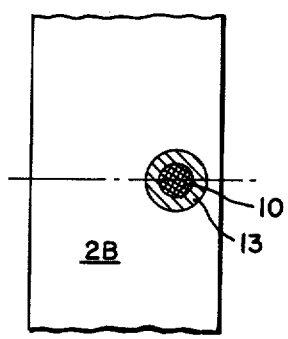
FIG. 4 is a view taken along line IV—IV of FIG. 3.

In FIGS. 3 and 4, there is illustrated a further embodiment of the present invention wherein the machine element is made from magnetic material and the ferromagnetic insert 10 is carried by the machine part in a different manner. The insert 10 is located within a larger insert or ring 13 consisting of non-magnetic material which is firmly installed and carried within a circumferential recess of corresponding dimensions formed within the machine element 2B for monitoring the temperature thereof. As best visualized from FIG. 3, a change in the magnetic flow in the pulse transmitter 5 during rotation of the machine part occurs when each of two diametrically-opposed sections of the ring 13 pass in front of the transmitter 5. This produces two short-term magnetic flow changes in the transmitter that follow each other very closely. These changes occur as a first portion of the non-magnetic ring 13 passes the transmitter and then as a second portion of the ring passes by the transmitter. The two pulses caused by the two flow changes also feed into an amplifier and pulse-shaper 6A which has its output connected to a timing circuit 14 which includes, for example, a monostable multivibrator. The pulse output signal from the amplifier and pulse-shaping circuit 6A is also delivered to a two-condition trigger circuit 15 which may include, for example, a flip-flop circuit that is per se well known in the art. The monostable multivibrator 14 is triggered by the first pulse received which also triggers the flip-flop 15.

Figure 5:
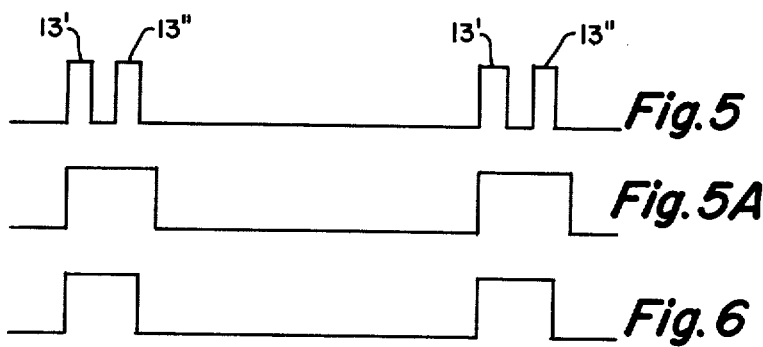
FIGS. 5, 5A and 6 are pulse waveforms illustrating the operation of the modified circuitry shown in FIG. 3.

The general nature of the pulses delivered by the pulse shaper and amplifier 6A is depicted by FIG. 5 wherein it will be observed that the pulses 13' and 13'' occur in a cyclic manner during each revolution of the machine element 2B. Those skilled in the art will readily understand that the transmitter 5, the pulse-shaper and amplifier circuit 6A or additional circuitry may be built into the apparatus to invert the signal produced by the transmitter 5 since the pulses 13' and 13'' occur when non-magnetic material passes in close proximity to the transmitter whereas in regard to FIGS. 1 and 2, the pulse occurs in response to the passage of the ferromagnetic insert 3.

Figure 5A:
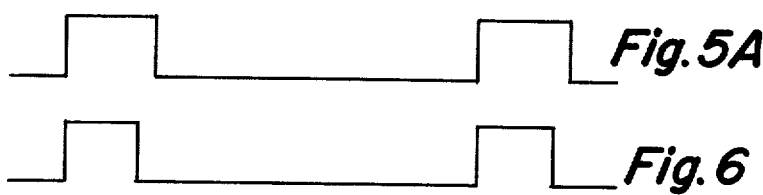
Figure 6:
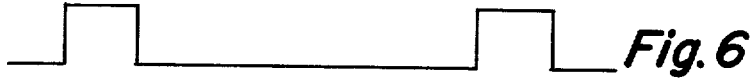

The first of the double pulses produced during each rotation of the machine element triggers the monostable multivibrator to remain conductive throughout a period which is representatively illustrated by the wave form of FIG. 5A wherein it can be readily understood that the timing circuit remains conductive for a period of time during which the double pulses 13' and 13" are produced. These double pulses pass through the timing circuit and are received by the flip-flop 15 which assumes an operative conductive position only when the second of the two pulses is received. In other words, the second pulse 13" of a given pair of pulses returns the flip-flop to its original position after which the timing circuit is deenergized. The pulse output signal from the flip-flop 15 is received by an intergrating circuitry including a resistor 7 and capacitor 8 which provide an essentially continuous signal to maintain the relay 9 in an energized state in the manner already previously described in regard to FIG. 1. When the temperature of the machine element 2B exceeds the Curie Point of the ferromagnetic insert 10, then a single rectangular pulse is produced by the transmitter 5 during each rotation of the machine element. An illustrative example of pulses of this nature is represented in FIG. 6 wherein it will be observed that the pulse duration corresponds to approximately the duration of the pair of pulses 13' and 13" illustrated in FIG. 5. The single pulses of FIG. 6 inhibit conductive switching of the flip-flop 15 in that since only a single pulse is received by this circuit, the flip-flop is not energized for the second time and does not transmit control pulse signal to the integrating circuitry. This causes the absence of a control signal which deenergized the relay 9 and disconnects the power supply from the drive for the machine element.

Those skilled in the art will readily understand that the wiring examples illustrated and described are examples of the monitor itself. Defects and malfunctions such as interruptions in the pulse delivering lines, short-circuits, missing ferromagnetic insert materials from the machine elements or other defects in the wiring elements always prevent the existence of a control signal for the relay and as such it will become deenergized to disconnect the power supply for rotating the machine part during monitoring of a part thereof.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for monitoring the temperature of a rotatable element during rotation without contact therewith, said apparatus comprising:

magnetic flow means including a ferromagnetic insert carried by said rotatable element for rotary movement therewith, said ferromagnetic insert having a Curie point temperature at which said insert becomes paramagnetic;

an inductive pulse transmitter forming an air gap with said ferromagnetic insert for producing electrical pulses in response to the passing movement of said insert relative to said transmitter;

means for shaping and amplifying the successive pulses produced by said transmitter;

means including an integrating circuit receiving the shaped and amplified pulses for producing a continuous control signal to indicate that the temperature of said insert lies below the Curie point temperature of the insert; and means responsive to said control signal for controlling rotation of said rotatable element in a dependent relation upon said ferromagnetic insert attaining a temperature which is not in excess of the Curie point temperature of said ferromagnetic insert.

2. The apparatus according to claim 1 further comprising non-magnetic, heat conductive shielding means for supporting said ferromagnetic insert to rotate with said rotatable element.

3. The apparatus according to claim 1 further comprising a ring of non-magnetic, heat conductive material attached to said rotatable element in a coaxial relation for supporting said ferromagnetic insert.

4. The apparatus according to claim 1 further comprising a non-magnetic, heat conductive member carried by said rotatable element for isolating said ferromagnetic insert from said rotatable element.

5. The apparatus according to claim 1 further comprising: a timing circuit responsive to signal pulses produced by said means for shaping and amplifying pulses, and a two-condition trigger circuit responsive to the pulses delivered by said means for shaping and amplifying pulses for conduction to said means for producing a control signal.

6. The apparatus according to claim 1 wherein said integrating circuit includes a resistor and a capacitor for providing an essentially continuous control signal in response to the shaped and amplified pulses delivered thereto.

* * * * *